United States Patent [19]

Yokoyama et al.

[11] Patent Number: 5,470,219
[45] Date of Patent: Nov. 28, 1995

[54] RUNNERLESS INJECTION MOLDING OF SYNTHETIC RESIN WITH A VALVE GATE

[75] Inventors: Kin-ichi Yokoyama; Izumi Kato, both of Yonezawa, Japan

[73] Assignee: Seiki Kabushiki Kaisha, Tokyo, Japan

[21] Appl. No.: 271,271

[22] Filed: Jul. 6, 1994

Related U.S. Application Data

[63] Continuation of Ser. No. 72,880, Jun. 3, 1993.

[30] Foreign Application Priority Data

Jun. 15, 1992 [JP] Japan ..................... 4-155163

[51] Int. Cl.⁶ .................... B29C 45/78; B29C 45/72; B29C 45/23
[52] U.S. Cl. .................... 425/144; 425/548; 425/549; 425/564; 264/40.6; 264/328.9; 264/328.15
[58] Field of Search .................. 425/547, 548, 425/549, 568, 564, 143, 144; 264/328.14, 328.9, 328.15, 40.6

[56] References Cited

U.S. PATENT DOCUMENTS

| | | | |
|---|---|---|---|
| 4,643,664 | 2/1987 | Yoshida | 425/549 |
| 4,875,848 | 10/1989 | Gellert | 425/549 |
| 4,894,197 | 1/1990 | Tsutsumi | 264/328.15 |
| 5,002,480 | 3/1991 | Gellert et al. | 264/328.15 |
| 5,071,340 | 12/1991 | LaBianca | 264/328.15 |
| 5,106,291 | 4/1992 | Gellert | 264/328.15 |
| 5,135,377 | 8/1992 | Gellert | 425/549 |

FOREIGN PATENT DOCUMENTS 56-144136  11/1981  Japan ................. 264/328.15

*Primary Examiner*—Jill L. Heitbrink
*Attorney, Agent, or Firm*—Elliot M. Olstein; Raymond J. Lillie

[57] ABSTRACT

A method for runnerless injection molding of a synthetic resin, provided with a novel valve gate for performing intermittent temperature control to forcibly change the property of a molten or solidified resin material adjacent to the gate, capable of performing a precision molding operation without leaving an improper gate mark. The apparatus therefor comprises a runner 3 with a temperature maintaining means for storing a molten resin and forming an injection passage, a gate 1 in communication with a cavity 2 connected to the end of the runner 3, a valve pin 4 enclosed within the runner 3, and an intermittent temperature control assembly P.

1 Claim, 6 Drawing Sheets

RUNNERLESS INJECTION MOLDING OF SYNTHETIC RESIN WITH A VALVE GATE

This application is a continuation of Ser. No. 08/072,880, filed Jun. 3, 1993.

BACKGROUND OF THE INVENTION

1. Field of the Invention

The present invention relates to a method and apparatus for runnerless injection molding of a synthetic resin, provided with a novel valve gate for performing intermittent temperature control to forcibly change the property of a molten or solidified resin material adjacent to the gate, capable of performing a precision molding operation without leaving an improper gate mark.

2. Description of the Prior Art

FIGS. 5 and 6 illustrate two conventional runnerless injection molding apparatus.

In the drawings, a reference numeral 1 denotes a gate, 2 a mold cavity, and 3 a runner. A valve pin 4 is enclosed within the runner 3. The tip 4a of the valve pin 4 is engageable with the gate rand 1a to close the gate 1. The valve pin 4 of valve means 5 is adapted to reciprocally move in its axial direction.

As shown in FIG. 5, the conventional apparatus is provided with a valve assembly, which is capable of opening or closing the valve by clamping and releasing the tip 4a of the valve pin 4 with respect to the gate 1, through the reciprocal motion of the piston body 7 by way of a fluid pressure control.

Another conventional valve assembly shown in FIG. 6 comprises a piston body 11 which is biased toward the gate side by a coiled spring 10 in a hollow chamber 9 of an enlarged member 8 provided in a runner 3. Therefore, a valve pin normally has its end engaged with the internal end of a gate 1 to close the gate 1, as urged by the coil spring 10.

As the injection molding operation is started, the valve pin 4, which is engaged with the gate 1, is upwardly raised by a predetermined injection pressure against the coil spring 10. After the operation is completed, the injection pressure reduces and gate pin 4 again engages at its end with the gate 11 to automatically close the valve. In the drawings, the apparatus includes a body heater for externally heating the runner assembly 3, a temperature sensor 13 for detecting the internal temperature in the runner 3, a manifold 14, and wiring 15.

In the above-described molding method, the temperature in the vicinity of the gate is not controlled, but is inevitable to be allowed to the ambient temperature of the mold. Accordingly, valve pin 4 is tend to be heated to a high temperature because of "less cooling of the gate", resulting in various problems of external appearance or mechanical strength of the molded products. On the other hand, because of "less heating of the gate", the temperature drop of the mold due to heat radiation often causes the ununiformity of resin viscosity and degradation of the products, and also causes defect operation or damage of the valve pin. Further defects are listed below:

1. Shrinkage, furrows or stringing of the products due to less cooling of the valve pin;
2. Rising at the gate portion due to solidification of resin at the gate to retard the proceeding of the valve pin;
3. The more the radius of the gate increases, the larger radius for the valve pin is required;
4. Gate seal becomes insatisfactory due to unfused or solidified portion of resin which is produced at the gate rand, because of less temperature rise at the gate when using a high viscous resin such as polycarbonate resin; and
5. Difficulty of molding when using the resins for which a fine adjustment of temperature in the range of the gate is required, such as polyamide or PET resin.

SUMMARY OF THE INVENTION

One of several solutions to overcome the afore-mentioned disadvantages of the conventional art is to provide an intermittent heating chip or a forcible cooling means near the gate. Further, it will be more effective to provide a tip including both intermittent heating means as well as forcible cooling means.

For the purpose of eliminating such disadvantages of the prior art, the present invention provides a novel method for runnerless injection molding of a synthetic resin, provided with a novel valve gate assembly, including a valve pin which is mounted and reciprocally movable within a runner, and a gate is open and closed by the tip of the valve pin. The gate is subject to intermittent temperature control in the manner of locally cooled and heated every time of opening or closing of the gate by the valve pin.

The invention also provides an apparatus for runnerless injection molding comprising a runner including a temperature maintaining means for storing a molten synthetic resin; a gate in communication with a cavity; a valve pin longitudinally disposed within the runner for opening and closing the gate; and an intermittent temperature control assembly.

The present invention is to provide a runnerless injection molding apparatus including the above-mentioned intermittent temperature control assembly comprising a tip heater around the conical periphery extending from the vicinity of the gate rearwardly over the gate rand. In an aspect of the present invention, the intermittent temperature control assembly further includes a forcible cooling means, whereby a cooling medium is supplied around the periphery of the gate for intermittently cooling the gate. Also, in another aspect of the present invention, the intermittent temperature control assembly also includes a forcible cooling means, whereby a cooling medium is circulated within the valve pin for intermittently cooling the tip of the valve pin.

DETAILED DESCRIPTION OF THE PREFERRED EMBODIMENTS

Figure 1:
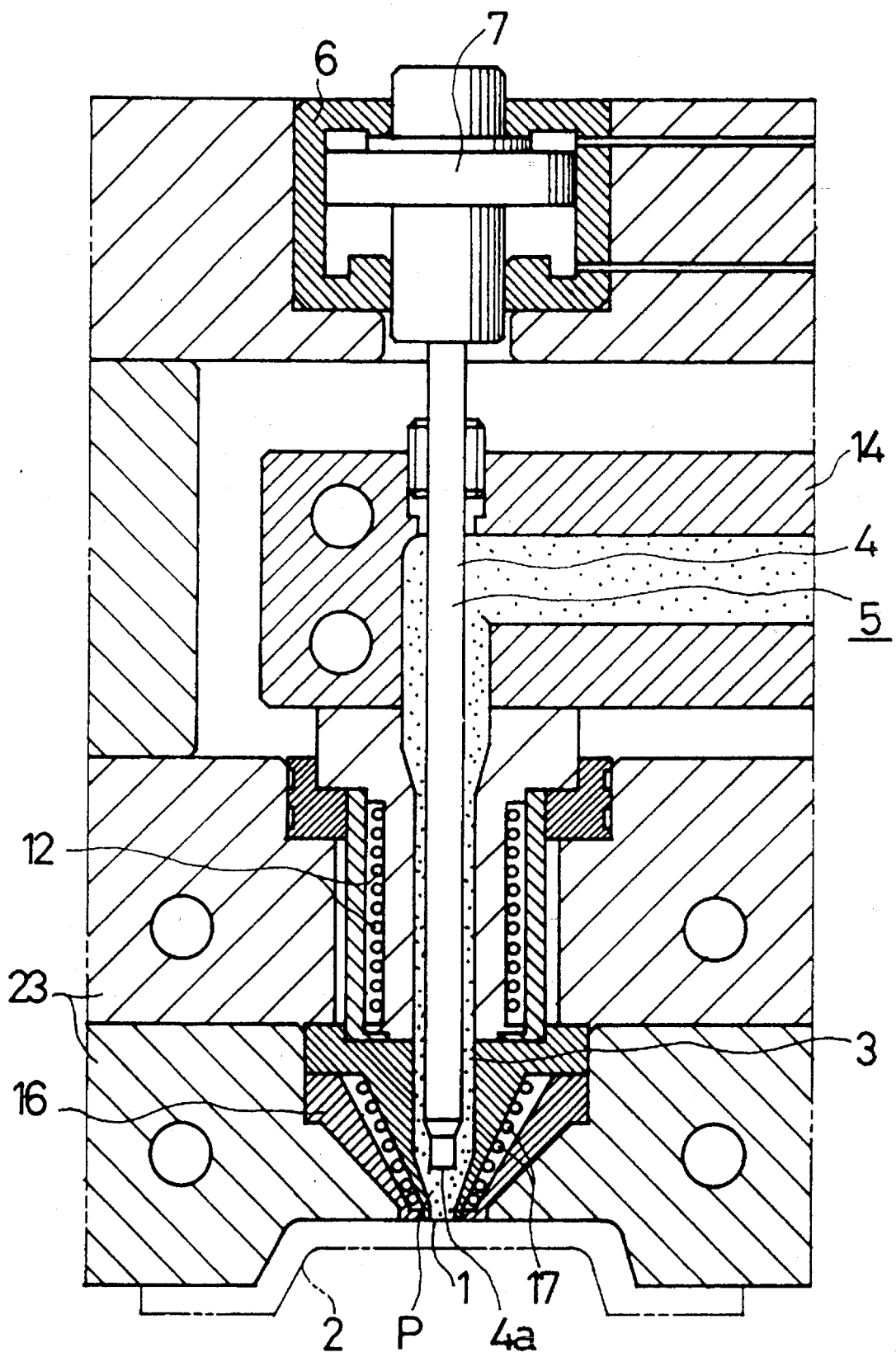
FIGS. 1 and 2 are vertical sectional views of the main structure of two embodiments showing the basic and specific configuration for effecting a method for runnerless injection molding according to the present invention.

Two embodiments in basic structures are described with reference to FIGS. 1 and 2, in which the basic structure is identical other than the members constructing the gate assembly, which is separate from or is integral with the runner assembly.

Members denoted by the reference numerals 12, 14 and 15 are identical to those shown in the aforementioned conventional apparatus. As illustrated in FIG. 1, a body heater 12 is provided independently from a conical member 16 including a separate gate 1. The gate 1 can be partially heated by a tip heater 17 provided in the conical member 16.

Figure 2:
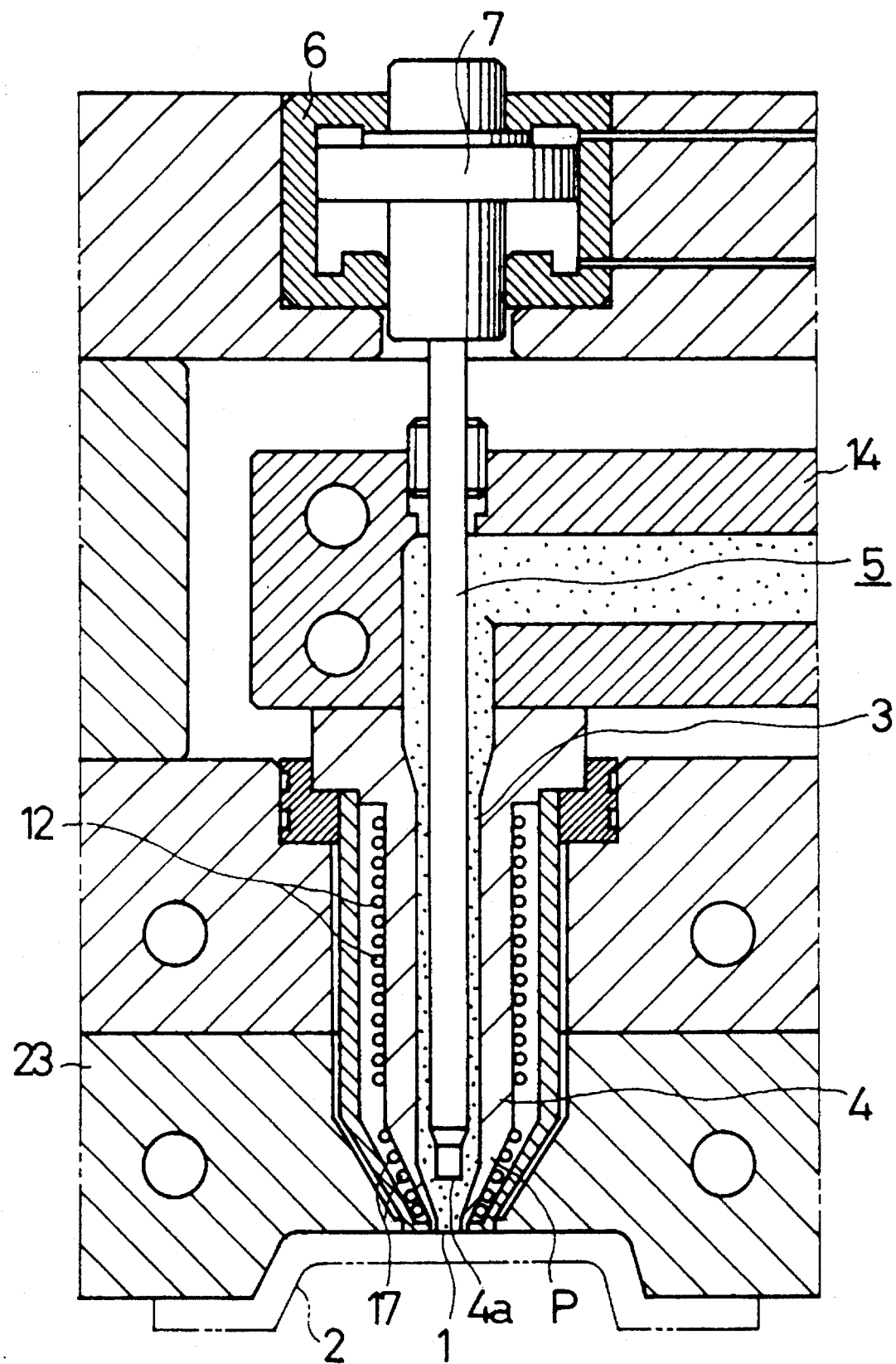

FIG. 2 illustrates another runner assembly including a body heater 12. On the tip of the assembly, it is provided a tip heater assembly 18 including a tip heater 17 which is wound as another circuit separate from the body heater 12.

Figure 3:
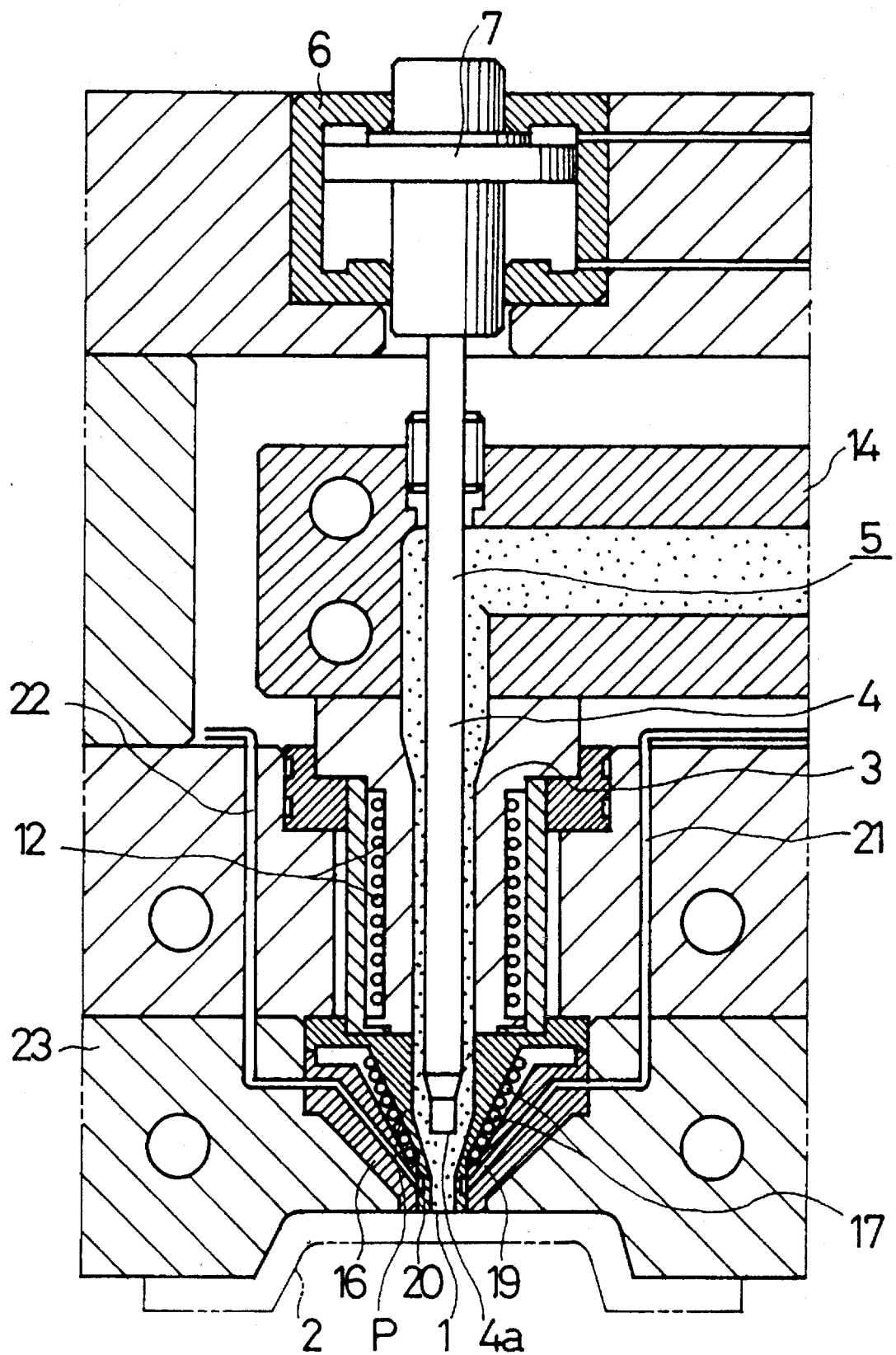
FIG. 3 is a vertical sectional view of another embodiment.

Each of tip heaters shown in FIGS. 1 and 3 constitutes an intermittent temperature control assembly P.

Injection molding operation started from the standby condition shown in each drawing. Initially, the resin in the gate 1 has been cooled and solidified, and tip heater 17 is energized to heat the gate 1. The resin is readily melted to open the gate 1, the molding operation is performed with a desired injection pressure, and the molten resin is injected to fill the mold cavity 2. The valve pin 4 readily downwardly moves to engage the gate 1 to close the gate 1, and at the same time to deenergize the tip heater 17 to let the gate 1 cooled. On the way, the resin filled in the cavity 2 is cooled and solidified by the cooling water in the mold.

Upon mold-separating operation, the molded product is removed from the mold, the tip heater 17 is again energized, and the valve pin 4 is returned to the initial position. Thereafter, the same process is repeated to continue injection molding operation.

In FIG. 3, which illustrates a still further embodiment, an intermittent temperature control assembly P further includes a forcible cooling means 19, which comprises an annular cooling channel 20 formed on an external periphery of the gate 1, an inlet passage 21 into which a cooling medium such as air is introduced, and an outlet passage 22. These passages 21 and 22 are formed within the metal mold 23.

Therefore, the tip heater 17 is deenergized to cool the gate 1 in the same manner to that in FIG. 1, and further the forcible cooling means 19 is actuated simultaneously by introducing a cooling medium from the passage 21 into the cooling channel 20 to perform a rapid cooling and proceed solidification of the molten resin.

Accordingly, this is suitable for the apparatus of valve gate construction for molding products having a larger gate dimension and larger cavity volume. This embodiment forms the forcible cooling disadvantage to heat and cool after the stoppage of heater heating as mentioned in the previous embodiment.

In the drawings, the same components as shown in FIG. 1 have the same numerals and their description is omitted.

Figure 4:
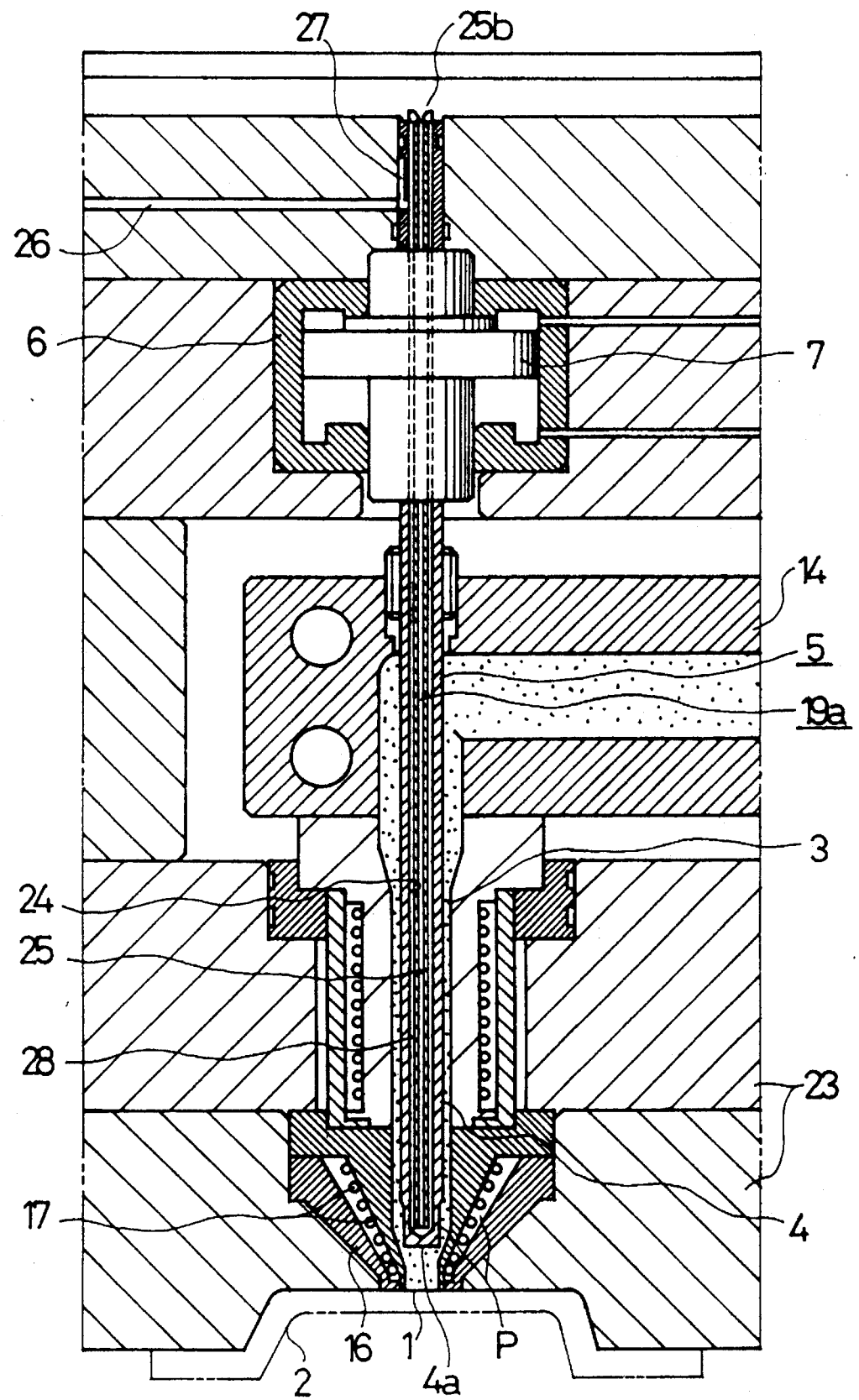
FIG. 4 is a vertical sectional view of a still further embodiment.
Figure 5:
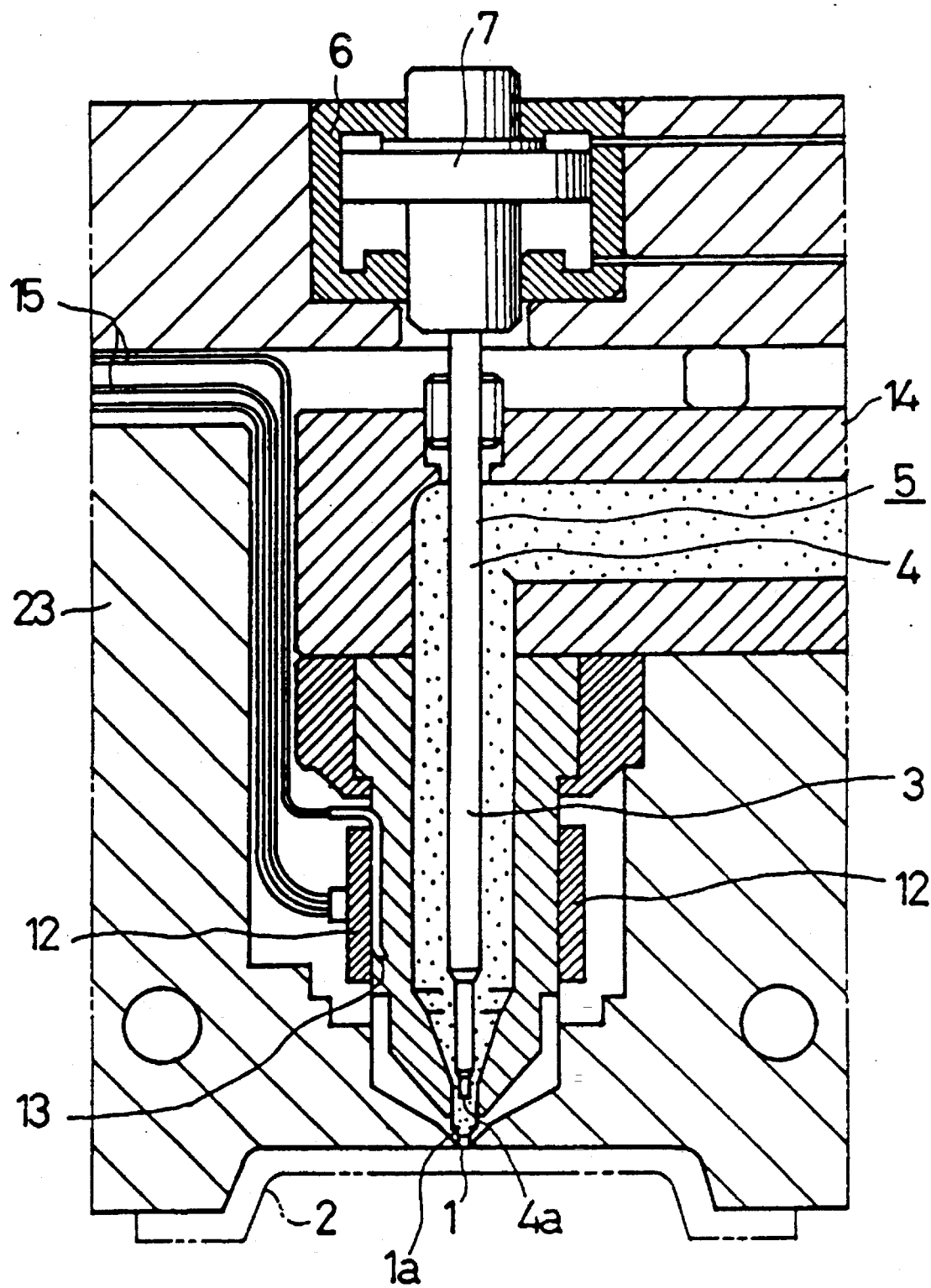
FIG. 5 is a vertical sectional view of a conventional embodiment.
Figure 6:
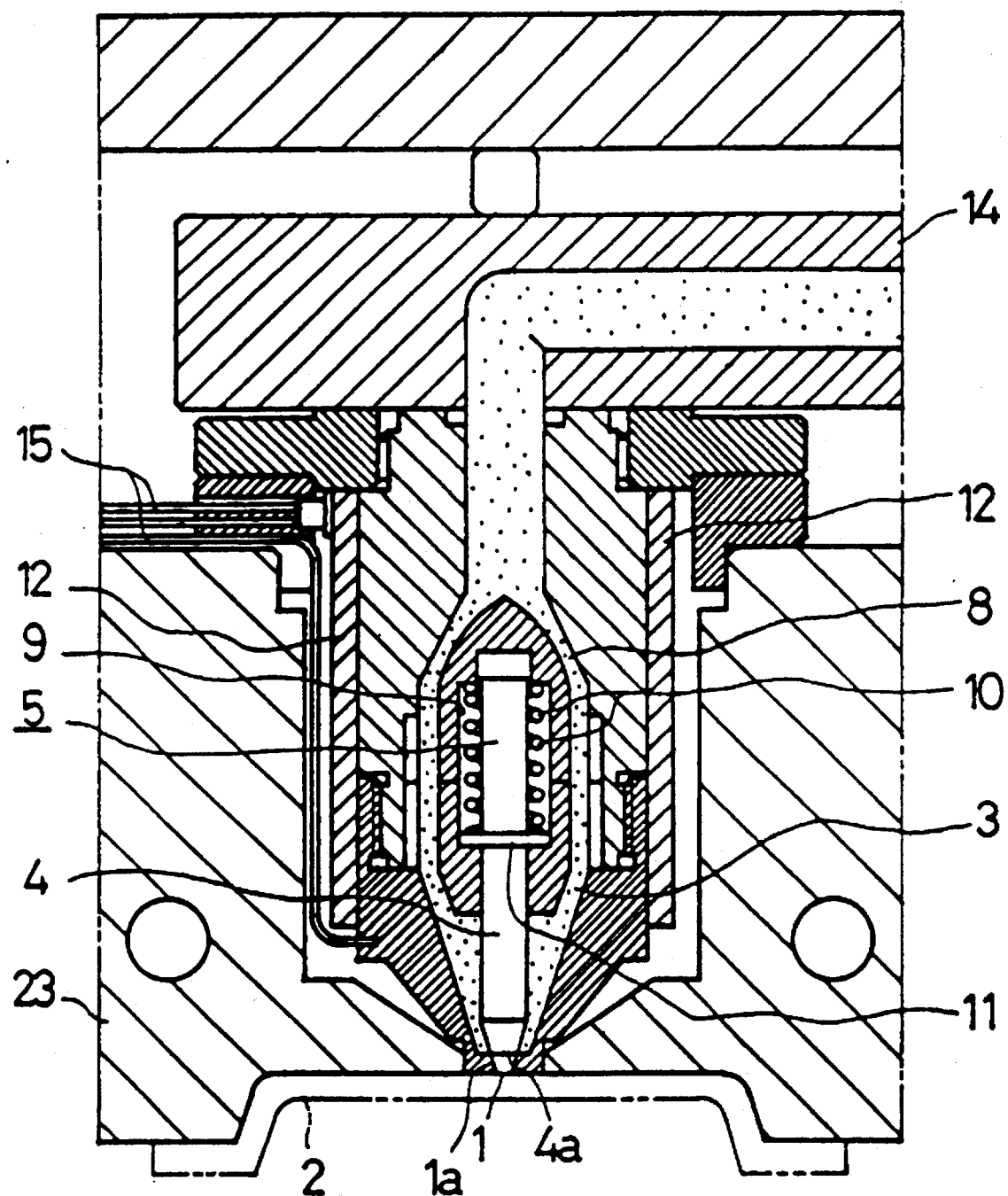
FIG. 6 is a vertical sectional view of another conventional embodiment.

In FIG. 4, which illustrates a still further embodiment, a forcible cooling means 19a is provided in the tip of valve pin 4, instead of channel 20 in FIG. 1. A longitudinal hollow 24 is Formed ranging from one end to close to the tip through the valve pin 4, a slender tube 25 is enclosed within the hollow 24, a tubular space formed between the hollow 24 and tube 25, and the tube 25 is formed so as to be open near the end of valve pin 4; further, a side opening 27 in communication with a passage 26 provided through the mold 23, such as the die plate, is provided for circulating a cooling medium. A cooling medium forced to flow from the upper end of tube 25 is supplied to locally and forcibly cool the valve pin 4. The side opening 27 is formed such that the portion thereof is the same length as the stroke of the valve pin 4.

In other words, the cooling means 19a includes the slender tube 25 enclosed within the central hollow 24, an tubular space 28 formed between the hollow 24 and tube 25, a side opening 27 in communication with the space 28, and a passage 26 extending from the opening 27. A cooling medium is forcibly introduced from an inlet 25b and supplied into the tip of the valve pin 4 to locally and forcibly cool the valve pin 4.

As is in the aforementioned embodiment, the valve pin 4 comes to engage with the gate 1 to close the gate 1, and at the same time tip heater 17 is deenergized, and further the forcible cooling means 19a is actuated to rapidly cool the gate 1. Such a cooling operation is still continued also during the cooling period of the cavity so that the cooling and solidifying time is minimized to largely improve the injection molding cycle.

In addition to the reciprocal motion of the valve pin 4, an intermittent temperature control assembly including a tip heater for locally heating the gate together with a forcible cooling means provides a solution to the problem caused by the "less cooling of the gate".

As a result, the invention provides an improved injection molding method and apparatus for producing products with a larger gate dimension and larger cavity volume, and also effective for molding from polyamide or PET resin.

What is claimed is:

1. A runnerless injection molding apparatus including a valve gate control system, said apparatus comprising:

a runner including a temperature maintaining means located on the outer periphery of said apparatus, said runner storing a molten synthetic resin and providing an injection passage therefor, said runner terminating in a cavity;

a gate in communication with said cavity;

a valve pin longitudinally disposed within said runner for opening and closing said gate;

a first forcible cooling means, whereby a cooling medium is supplied around the periphery of said gate for cooling intermittently said gate;

a second forcible cooling means, whereby a cooling medium is circulated within said valve pin for cooling intermittently the tip of said valve pin; and an intermittent temperature control assembly for cooling and heating locally said gate, characterized in that a tip heater is provided around said gate and around the periphery of said cavity.

* * * * *